United States Patent [19]

Kitabayashi et al.

[11] Patent Number: 5,531,087

[45] Date of Patent: *Jul. 2, 1996

[54] METAL SHEET BENDING MACHINE

[75] Inventors: Hiroyuki Kitabayashi, Hirakata; Yoshiaki Kuroda; Ikuo Kamada, both of Komatsu; Toshiyuki Ooenoki, Hirakata, all of Japan

[73] Assignee: Kabushiki Kaisha Komatsu Seisakusho, Tokyo, Japan

[ * ] Notice: The term of this patent shall not extend beyond the expiration date of Pat. No. 5,367,902.

[21] Appl. No.: 292,940

[22] Filed: Aug. 18, 1994

Related U.S. Application Data

[63] Continuation-in-part of Ser. No. 30,467, Apr. 5, 1993, Pat. No. 5,367,902.

[51] Int. Cl.⁶ .......................... B21C 51/00; B21B 37/14; B30B 15/26
[52] U.S. Cl. ................. 72/37; 72/31.01; 72/7.2; 72/389.3
[58] Field of Search .............. 72/7, 30, 31, 34, 72/37, 389.3; 356/3.02, 3.03, 4.08, 152.2

[56] References Cited

U.S. PATENT DOCUMENTS

| | | | |
|---|---|---|---|
| 4,430,879 | 2/1984 | Rolland | 72/389 |
| 4,564,765 | 1/1986 | Blaich | 250/561 |
| 4,770,523 | 9/1988 | Yamada | 356/376 |
| 5,196,900 | 3/1993 | Pettersen | 356/376 |
| 5,367,902 | 11/1994 | Kitabayashi et al. | 72/37 |

FOREIGN PATENT DOCUMENTS

| | | |
|---|---|---|
| 0470263A1 | 9/1991 | European Pat. Off. . |
| 3216053C2 | 11/1983 | Germany . |
| 54-36758 | 3/1979 | Japan . |
| 59-18408 | 1/1984 | Japan . |
| 59-20924 | 2/1984 | Japan . |
| 59-160707 | 9/1984 | Japan . |
| 59-176611 | 10/1984 | Japan . |
| 59-174221 | 10/1984 | Japan . |
| 59-173716 | 10/1984 | Japan . |
| 59-197813 | 11/1984 | Japan . |
| 63-49327 | 3/1988 | Japan . |
| 64-2723 | 1/1989 | Japan . |
| 1-192421 | 8/1989 | Japan . |
| 1-271013 | 10/1989 | Japan . |
| 1-273618 | 11/1989 | Japan . |
| 2-82106 | 3/1990 | Japan . |
| 2-280919 | 11/1990 | Japan . |
| 2-280920 | 11/1990 | Japan . |
| 2-284721 | 11/1990 | Japan . |

*Primary Examiner*—David Jones
*Assistant Examiner*—Rodney Butler
*Attorney, Agent, or Firm*—Senniger, Powers, Leavitt & Roedel

[57] ABSTRACT

A metal sheet bending machine for bending a metal sheet inserted between an upper bender and lower bender to a desired angle. While the metal sheet is being bent to the desired angle, a linear image of projected measuring light, which rotates with a change in the bending angle of the metal sheet, is formed by a measuring light source on an outer face of the bent metal sheet and sequentially photographed and stored. Based on the stored images, the bending angle of the metal sheet is calculated. Based on the result of the calculation, the positions of tile upper and/or lower benders are controlled whereby the metal sheet can be bent to the desired angle. The bending angle of the metal sheet may be obtained based on the rotating angle of the linear image of projected measuring light formed on the photographed images, or based on an angle formed by the linear image of projected measuring light and a linear image of projected reference light formed by a reference light source for projecting light onto the outer face of the metal sheet while the metal sheet is being bent to the desired angle so as to form the linear image at a desired fixed angle irrespective of the bending angle.

14 Claims, 12 Drawing Sheets

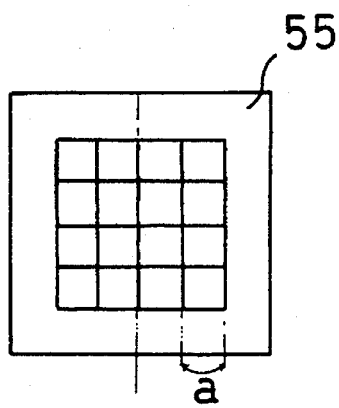
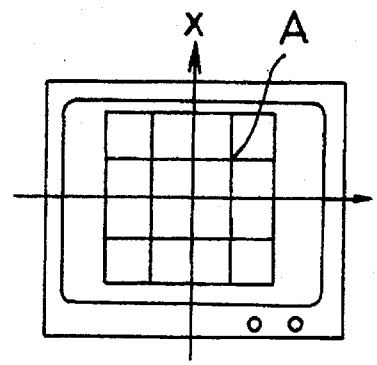
FIG. 17                FIG. 18
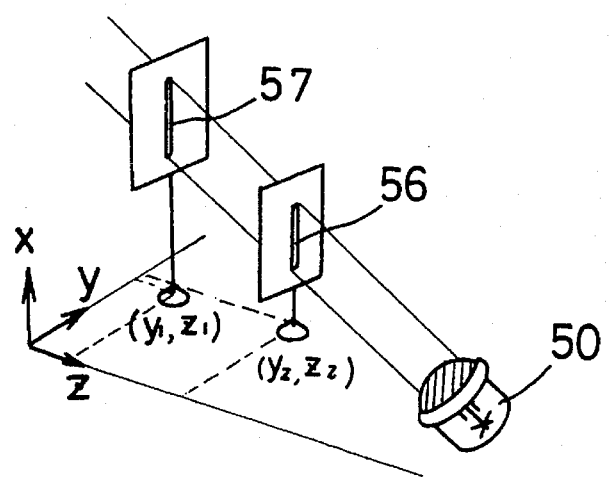
FIG. 19

METAL SHEET BENDING MACHINE

This is a continuation-in-part of U.S. patent application Ser. No. 08/030,467 filed Apr. 5, 1993, now U.S. Pat. No. 5,367,902, the entire disclosure of which is incorporated herewith by reference.

TECHNICAL FIELD OF THE INVENTION

The present invention relates to a metal sheet bending machine for bending a metal sheet inserted between an upper bender and lower bender to a desired angle.

BACKGROUND ART

Conventional detection mechanisms for detecting the bending angle of a metal sheet, provided in metal sheet bending machines are broadly classified into two major categories, namely, contact and non-contact.

An example of a detection mechanism of the contact type is set out in Japanese Patent Publication Laid-Open No. 1-273618 (1989). The above disclosure teaches a continuous follow-up angle detection device to which a rectangular link is applied and wherein the inclination of a probe in contact with the inclined surface of a metal sheet is read by an encoder provided within the link mechanism, thereby detecting the bending angle of the metal sheet.

In a widely known detection mechanism of the non-contact type, by the use of a plurality of range sensors, the distance from each sensor to a bent metal sheet is detected and the difference between the respective distances is obtained, thereby detecting the bending angle of the metal sheet. Examples of the above detection mechanism are disclosed in Japanese Patent Publication Laid-Open No. 63-49327 (1988), No. 64-2723 (1989) and No. 1-271013 (1989). As the range sensors, the first mechanism employs eddy-current sensors, the second employs electrostatic capacitance sensors, and the third employs optical sensors.

Such a bending angle detection mechanism of the contact type as disclosed in Japanese Patent Publication Laid-Open 1-273618 (1989) requires that the bent legs of a metal sheet should be comparatively long in order to ensure high measurement accuracy, and it is therefore difficult to apply this mechanism to a metal sheet with short legs. It has other problems in that the long use of the mechanism causes the probe to wear and to be deformed because of the long contact with the metal sheet, resulting in the deterioration of the measurement accuracy, and the space required for measurement is restricted by the lower bender. Furthermore, in the case of a thin metal sheet to be bent, the metal sheet is prone to be deflected being in contact, with the probe. This also makes it difficult to ensure accuracy in the detection of the bending angle.

In the bending angle detection mechanisms of the non-contact type wherein eddy-current sensors are employed as taught by Japanese Patent Publication Laid-Open No. 63-49327(1988), or electrostatic capacitance sensors are employed as taught by Japanese Patent Publication Laid-Open No. 64-2723(1989), the output varies according to the material of a metal sheet to be bent, and therefore measuring conditions have to be altered whenever different materials are used. In the mechanism of Japanese Patent Publication Laid-Open No. 1-271013(1989) wherein optical sensors are employed, illuminated light is diffused in some surface conditions of a metal sheet. This causes large measurement errors and the deterioration of the measurement accuracy.

One of the present invention is therefore to overcome the above problems by providing a metal sheet bending machine for bending a metal sheet to a desired angle, which is capable of detecting a bending angle with high accuracy during the bending process irrespective of the length of the bent legs of the metal sheet, even if metal sheets made of different materials are used.

DISCLOSURE OF THE INVENTION

According to the present invention that has been made for the purpose of accomplishing the above object, there is provided a metal sheet bending machine for bending a metal sheet, the machine having an upper bender and lower bender between which the metal sheet is positioned for bending the metal sheet to a desired angle along a bending line, said machine comprising basically:

(a) a measuring light source for projecting a linear image onto an outer face of the metal sheet while the metal sheet is being bent to the desired angle, said light source positioned relative to the metal sheet so that the linear image of projected measuring light which rotates as the bending angle of the metal sheet changes as a result of bending of the metal sheet by changing the relative position of the upper and lower benders;

(b) photographing means for sequentially photographing the outer face of the bent; metal sheet on which the linear image of projected measuring light is formed by the measuring light source, while the metal sheet is being bent to the desired angle, said photographing means forming sequential images representative of tile position of the linear image on the outer face as the metal sheet is bent;

(c) memory means for storing sequential images which have been photographed by the photographing means, each sequential image including the linear image of projected measuring light;

(d) calculating means for calculating, based on changes in the rotated angular position of the linear image of successive image stored in the memory means, a bending angle of the metal sheet while the metal sheet is being bent and the resulting sequential images are being photographed; and (e) control means for controlling the positions of the upper bender and/or lower bender according to a calculation result obtained from the calculating means.

According to such a metal sheet bending machine, while a metal sheet is being bent to a desired angle, light is projected from the measuring light source onto the outer face of the bent metal sheet so that a linear image of projected measuring light is formed, and then, the linear image of projected measuring light is sequentially photographed by the photographing means and the photographed images are stored in the memory means. On tile images thus photographed, the linear image of projected measuring light changes its angle, rotating with a change in the bending angle, and the rotating angle of the linear image of projected measuring light becomes a specified angle at the time that the metal sheet has been bent to the desired angle. Accordingly, the linear image of projected measuring light formed on the outer face of the metal sheet is photographed and stored during the time that the metal sheet is being bent, and based on the stored images, a bending angle of the metal sheet is obtained two-dimensionally by the calculating means from the rotating angle of the linear image of projected measuring light on the images. Then, the upper bender and/or lower bender are controlled by the control unit based on the calculating result such that the movements of the upper bender and/or lower bender are stopped when the turning angle is coincident with a specified angle, whereby the metal sheet can be bent to the desired angle.

Preferably, the metal sheet bending machine further comprises a reference light source forming a linear image of projected reference light on the outer face of the metal sheet while the metal sheet is being bent to the desired angle so as to form the linear image at a desired fixed angle irrespective of the bending angle, on the images photographed by the photographing means, and the desired bending angle of the metal sheet calculated by the calculating means is a function of an angle formed by the linear image of projected measuring light formed by the measuring light source and the linear image of projected reference light formed by the reference light source.

Preferably, the reference light source forms the linear image of projected reference light such that the desired bending angle of the metal sheet calculated by the calculating means is obtained when the linear image of projected measuring light is parallel with the linear image of projected reference light. In such a metal sheet bending machine, while the metal sheet being bent to the desired angle, lights are projected from the reference light source and the measuring light source onto the outer face of the bent metal sheet so that the linear image of projected reference light and the linear image of projected measuring light are formed. The two linear projected light images thus formed are sequentially photographed by the photographing means and the photographed images are stored in the memory means. On the photographed images, the linear image of projected reference light is formed at an arbitrary fixed angle irrespective of the bending angle of the metal sheet. On the other hand, the linear image of projected measuring light changes its angle, turning with a change in the bending angle and becomes parallel with the linear image of projected reference light formed by the reference light source when the metal sheet is bent to the desired angle. Accordingly, the two linear projected light images formed on the outer face of the metal sheet are sequentially photographed while the metal sheet being bent; angles formed by the two linear projected light images on the photographed images are obtained by the calculating means; and then, the upper bender and/or lower bender are controlled by the control unit based on the calculation result such that the movements of the upper bender and/or lower bender are stopped when the two linear projected light images are parallel with each other, whereby, the metal sheet can be bent to the desired angle.

Preferably, the measuring light source, the reference light source and the photographing means are each movable along an axis in parallel with the bending line of the metal sheet so that the bending angle can be detected at a desired position on the outer face of the bent metal sheet, by moving the measuring light source, the reference light source and the photographing means. Further, the linear images photographed by the above photographing means may be displayed on an image display means, whereby it is possible to visually confirm that the metal sheet is being bent to a desired angle.

It is preferable that the measuring light source comprises a source selected from a slit-shaped measuring light source and a plurality of spot-shaped measuring light sources arranged in a line, and that the reference light comprises a source selected from a slit-shaped reference light source and a plurality of spot-shaped reference light sources arranged in a line.

Preferably, the calculating means calculates a bending angle of the metal sheet based on a preset photographing angle for the photographing means and a preset light projecting angle for the measuring light source. This arrangement enables the calculation to be simplified. In this case, it is preferable that the photographing angle is set to 90° and the light projecting angle is set to 45°.

Preferably, the calculating means calculates a bending angle of the metal sheet based on a first equation representative of a plane in which an image of the linear image of projected measuring light, formed by the photographing means and the focal point of the photographing means lie and based on a second equation representative of the plane of measuring light projected from the measuring light source. With this arrangement, a bending angle can be calculated taking into account the distance between the focal point of the photographing means and a surface to be measured. As a result, high-accuracy angle detection free from detection errors can be achieved.

The first equation is preferably calculated based on the coordinates of the image formed by the photographing means, the image being formed on a calibration plate disposed between the outer face of the metal sheet and the photographing means. As the calibration plate, a plate on which a grid, dot or concentric circle pattern having a given pitch is depicted may be used.

The second equation is preferably calculated based on the positions of two slits through which the measuring light passes, the slits being disposed between the measuring light source and the outer face of the metal sheet.

BRIEF DESCRIPTION OF DRAWINGS

FIG. 1 is a schematic view;

FIG. 2 is a partially enlarged view;

FIG. 3 is a block diagram illustrating an image processing method and a ram control method;

FIGS. 4(A) through 4(C) show one example of photographed images and the positional relationship among a metal sheet, a light source and a CCD camera;

FIG. 4(A) is a schematic view of an angle of photographing the image by the CCD camera;

FIG. 4(B) is a schematic view of a projection angle of light from the light source;

FIG. 4(C) is a schematic view of an angle of a projected light image on the photographed image;

FIG. 5 schematically shows the positional relationship among the metal sheet, a measuring light source and the CCD camera;

FIG. 6 schematically shows one example of the photographed images;

FIG. 7 is a flow chart of a process of bending the metal sheet;

FIG. 8 is a flow chart illustrating the image processing method and the ram control method;

FIG. 9 is a schematic view;

FIG. 10 is a schematic view showing the positional relationship among a metal sheet, measuring light source, reference light source and CCD camera;

FIG. 11 schematically shows one example of photographed images; and

FIG. 12 is a flow chart illustrating an image processing method and a ram control method;

FIG. 13 is a perspective view illustrating image formation by orthogonal projection;, FIG. 14 is a perspective view illustrating image formation in which an image is formed through the focal point of the lens;

FIG. 15 is a perspective view illustrating how the angle of a linear image of projected measuring light varies according to the distance between a surface to be measured and a photographing plane;

FIGS. 16 to 19 are for explaining an example of calculation in which the distance between the focal point of the lens and the surface to be measured is taken into account;

FIG. 16 is a schematic diagram showing the positional relationship between the metal sheet, measuring light source, reference light source and CCD camera;

FIG. 17 shows a calibration plate;

FIG. 18 shows a photographed image of the calibration plate; and

FIG. 19 is a perspective view showing a system arrangement for obtaining the plane equation of measuring light by calculation.

BEST MODE FOR CARRYING OUT THE INVENTION

Figure 1:
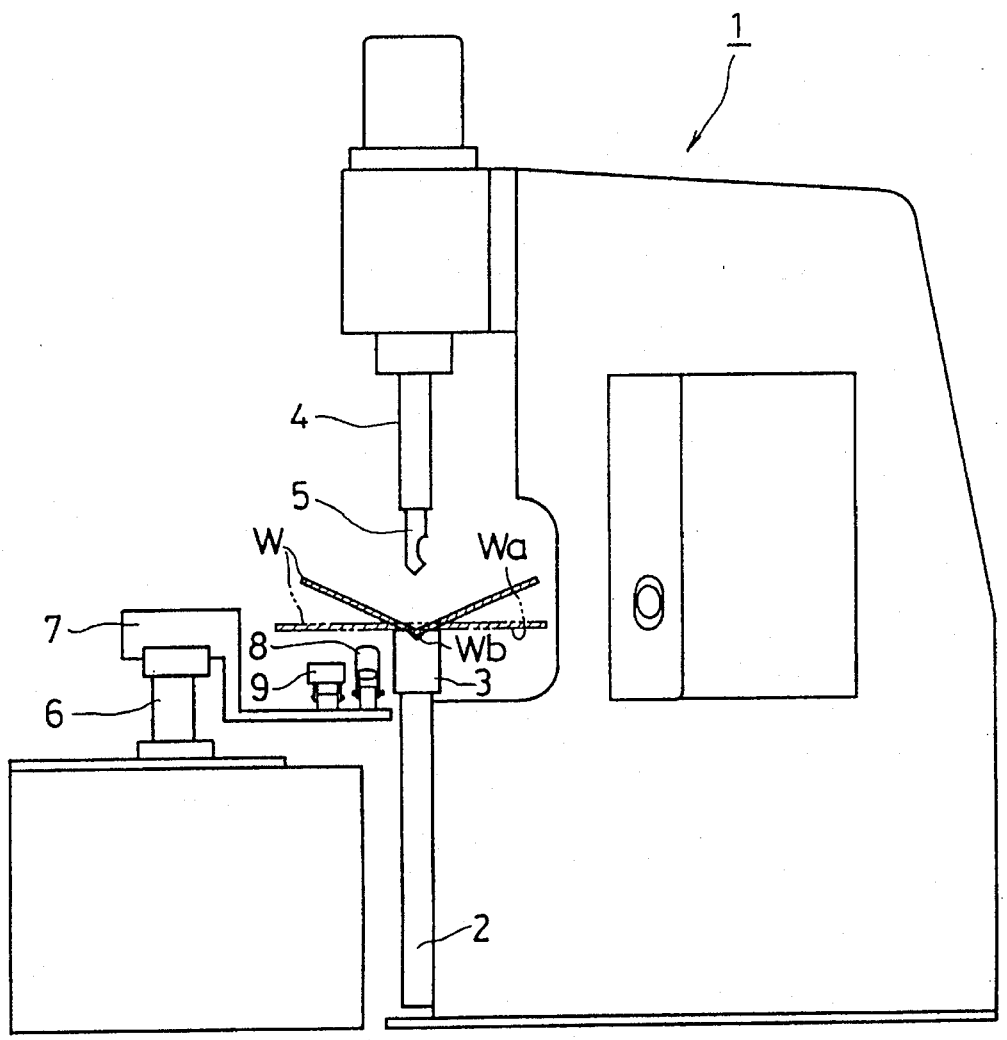
FIGS. 1 through 8 are for a first embodiment of a metal sheet bending machine according to the invention.

Referring now to the drawings, concrete embodiments of a metal sheet bending machine according to the invention will be hereinafter described.

First Embodiment

First of all, there will be given an explanation on a metal sheet bending machine for bending a metal sheet to a desired angle according to a first embodiment, which employs a measuring light source for projecting light onto an outer face of the bent metal sheet so as to form a linear image of projected measuring light which moves, turning with a change in the bending angle of the metal sheet.

Figure 2:
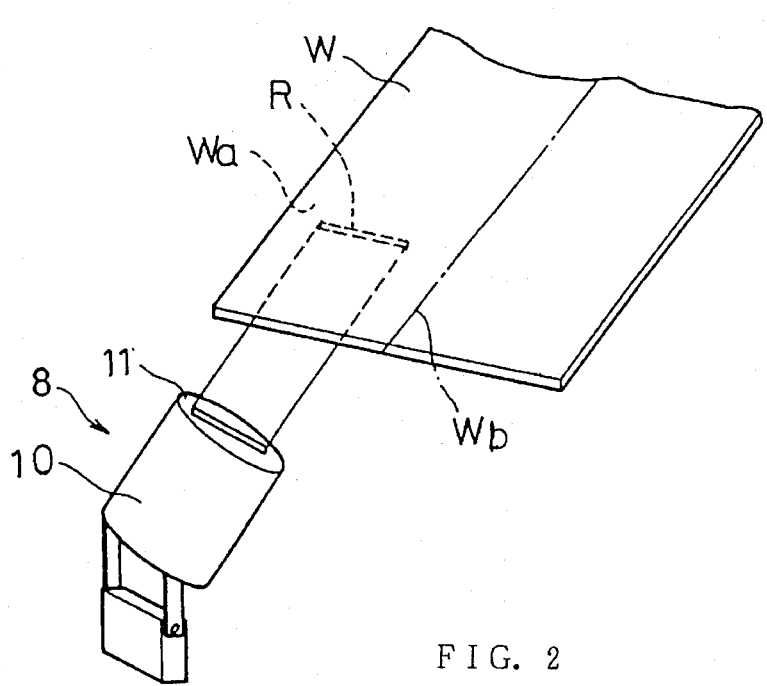

In a metal sheet bending machine 1 shown in FIGS. 1 and 2, there are provided a lower bender 3 supported on a frame 2 and an upper bender 5 that is opposite to the lower bender 3 and is attached to the leading edge of a ram 4. The ram 4 is positioned above the lower bender 5 and can be lifted and lowered freely. A metal sheet W is so mounted on the lower bender 3 as to be positioned between the upper bender 5 and the lower bender 3 so that the metal sheet W can be bent by these benders 3, 5. When the ram 4 is lowered, the metal sheet W is pressed by the upper bender 5 and the lower bender 3, while being held therebetween, and then is bent to a desired angle indicated by the continuous line. The bending angle is determined by the lowest position (hereinafter, this position is referred to as "bottom dead point") of the ram 4. A ram control unit for controlling the lifting and lowering of the ram 4 is not shown in FIG. 1. Mounted on a bracket 7 supported on a back stopper 6 disposed on a side of the lower bender 3 are a measuring light source 8 and a CCD camera 9. The measuring light source 8 is slit-shaped and projects a linear image of projected measuring light R onto an outer face Wa of the bent metal sheet W. The CCD camera 9 has 480×512 picture elements and serves, as the photographing means of the invention, to photograph the linear image of projected measuring light R formed by the measuring light source 8. The angle between the measuring light source 8 and the outer face Wa of the metal sheet W and the angle between the CCD camera 9 and the outer face Wa are adjustable. The measuring light source 8 and the CCD camera 9 are movable in parallel with a bending line Wb of the metal sheet W. The slit-shaped measuring light source 8 is comprised of a semiconductor laser 10 for emitting parallel light having a wavelength of 0.8 μm and a slit plate 11 that has a 2 mm(short side)×10 mm(long side) slit disposed on the optical path of the semiconductor laser 10.

Figure 3:
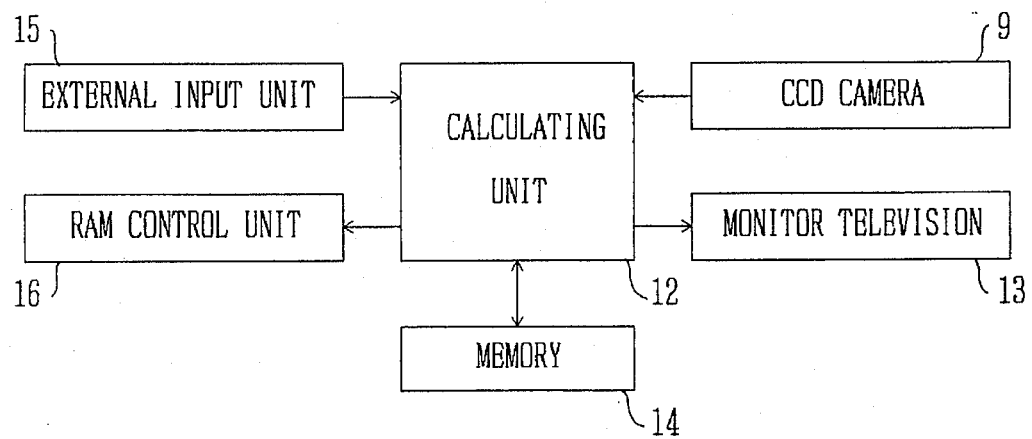

As shown in FIG. 3, images photographed by the CCD camera 9 are sent to a calculating unit 12 that serves as the calculating means of the invention and then displayed by a monitor television 13 that serves as the image display means of the invention. At the same time, the images are stored as image data in a memory 14 that serves as the memory means of the invention. On measuring conditions supplied from an external input unit 15, the image data are analyzed and calculated by the calculating unit 12. From this calculation, the bending angle is obtained. The bending angle obtained from the calculation is supplied to a ram control unit 16 where the bottom dead point of the ram 4 is controlled so that the metal sheet W can be bent to a desired angle.

Generally, when a linear image of projected light U is projected from a slit-shaped light source L onto the outer face Wa of the bent metal sheet W as shown in FIGS. 4(A), 4(B) and 4(C) and photographed by a CCD camera C, the projected light image angle α of a linear image of projected light U' formed on the photographed image is described by the following equation (1):

$$\tan \alpha = \sin (90°-\theta/2) / [\tan \beta \cdot \sin (\gamma+90°-\theta/2)] \quad (1)$$

where $\theta$ is the bending angle of the metal sheet W;

$\beta$ is the projection angle of the slit light; and $\gamma$ is the photographing angle of the CCD camera C;

The respective angles in Equation (1) will be described below.

The projection angle $\beta$ of the slit light: In the condition before the metal sheet W is bent (i.e., $\theta=180°$), the light source L, having an optical path parallel with the bending line Wb and a slit whose long sides are orthogonal to the bending line Wb, is turned upwards through the angle $\beta$ about the straight line that is on the outer face Wa, being orthogonal to the bending line Wb. When light is projected in the above situation, the outer face Wa and the compressed plane of the slit light form the projection angle $\beta$.

Photographing angle $\gamma$: In the condition before the metal sheet W is bent (i.e., $\theta=180°$), the CCD camera C, which has a photographing axis orthogonal to the bending line Wb and is positioned such that its photographing plane is orthogonal to the outer face Wa, is turned downwards through the angle $\gamma$ about the bending line Wb. When the image is photographed in the above situation, the outer face Wa and the photographing axis form the photographing angle $\gamma$.

The projected light image angle $\alpha$: On the image photographed by the CCD camera C, a vertical line and a long side of the linear image of projected light U' form the projected light image angle $\alpha$.

In the case where $\beta=45°$ and $\gamma=90°$ in Equation (1), Equation (1) is simplified as described by Equation (2) and rearranged by Equation (3).

$$\tan \alpha = \cos(\theta/2)/\sin(\theta/2) \qquad (2)$$
$$= \cot(\theta/2)$$
$$= \tan(90° - \theta/2)$$
$$\therefore \alpha = 90° - \theta/2 \qquad (3)$$

Therefore, the linear image of projected light U formed by the light source L at the projection angle β on the bent outer face Wa of the metal sheet W rotates as the metal sheet W is bent, with the result that the linear image of projected light U' also rotates, during the bending of the metal sheet W, in the reference images that are photographed by the CCD camera C at the photographing angle γ. Accordingly, the projected light image angle α is represented by Equation (3) α=90°−θ/2, using the bending angle θ of the metal sheet W.

Figure 4:
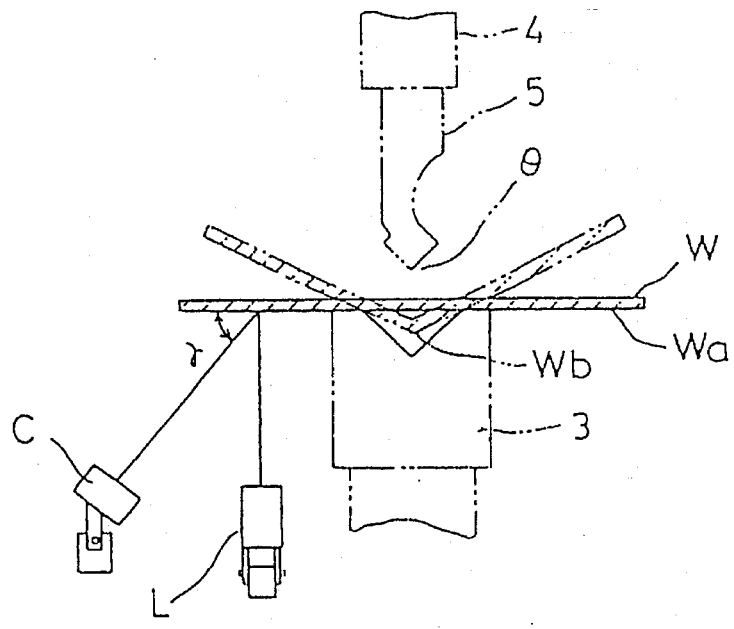
Figure 4:
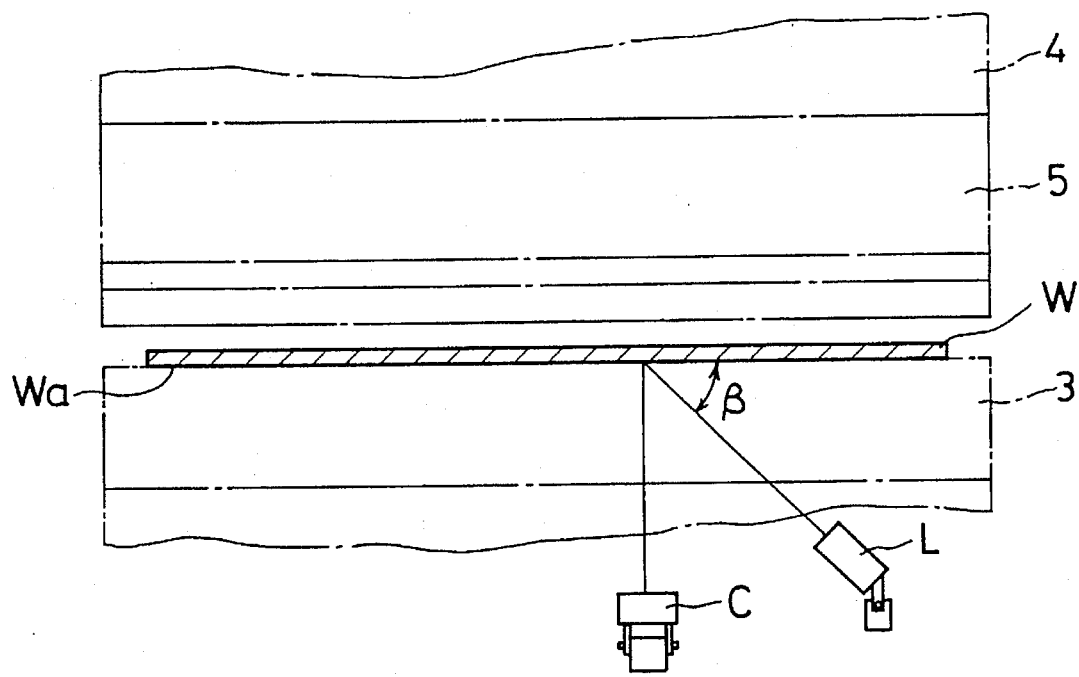
Figure 4:
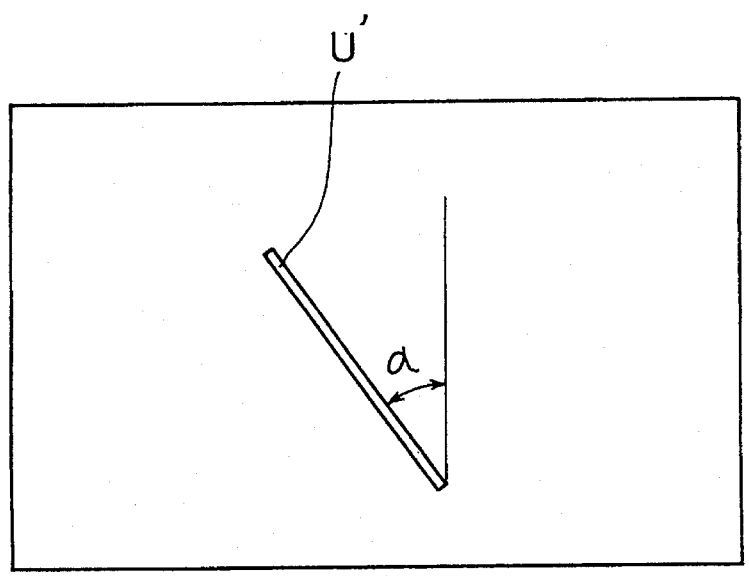
Figure 5:
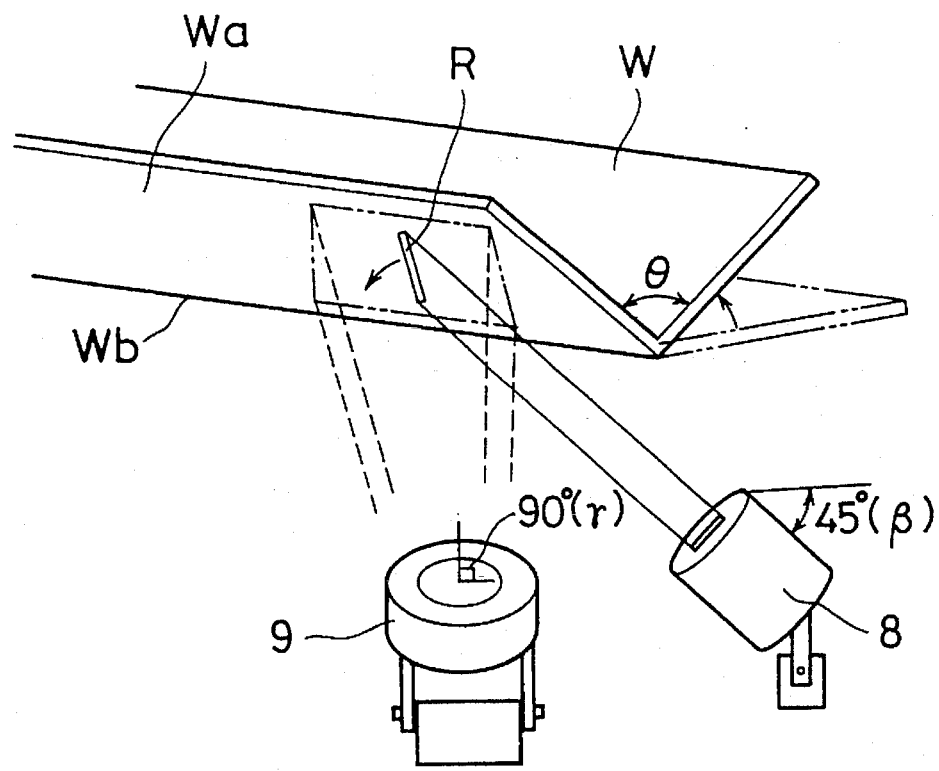
Figure 6:
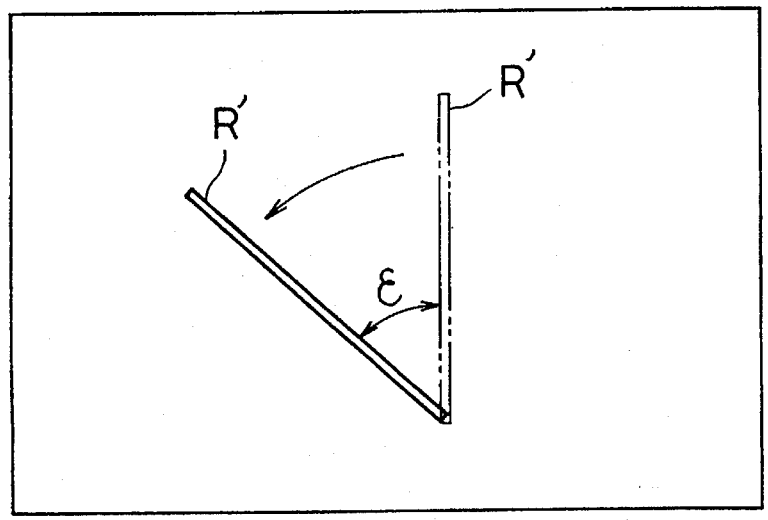

In the first embodiment shown in FIG. 5, in consideration of the relationship between the bending angle θ of the metal sheet W and the projected light image angle α on the photographed image, the measuring light source 8 is arranged in a position which can be obtained from Equation (1) when the projection angle β=45°, and the CCD camera 9 is arranged such that the photographing angle γ is 90° (see FIG. 4). When the linear image of projected measuring light R, which has been projected from the measuring light source 8 onto the outer face Wa of the bent metal sheet W, is photographed in the above positional situation, a linear image of projected measuring light R' formed by the measuring light source 8 on the photographed image shown in FIG. 6 is represented by a projected light image angle ε that varies with a change in the bending angle θ of the metal sheet W. The relationship between the bending angle θ of the metal sheet W and the projected light image angle ε is represented by Equation (4) derived from Equation (3).

$$\epsilon = 90° - \theta/2 \qquad (4)$$

Thus, when the desired bending angle of the metal sheet W is θ, a point, at which the projected light image angle ε of the linear image of projected measuring light R' formed by the measuring light source 8 satisfies Equation (4), can be obtained by executing specified image processing and calculation with the ram 4 being gradually lowered. This point is the bottom dead point of the ram 4, and therefore, the metal sheet W can be bent to the desired angle, by controlling the ram 4 with the ram control unit 16 such that the lowering of the ram 4 is stopped at the bottom dead point.

It should be noted that for bending the metal sheet W to the desired angle, it is necessary to bend the metal sheet W to a little smaller angle than the target angle, taking a returned angle caused by spring back into account. The amount of spring back varies according to the material and thickness of the metal sheet W and can be experimentally obtained. In an actual bending process, it is targeted that a metal sheet is bent to an amended bending angle that is obtained by taking into account the amount of spring back to a desired angle.

Figure 7:
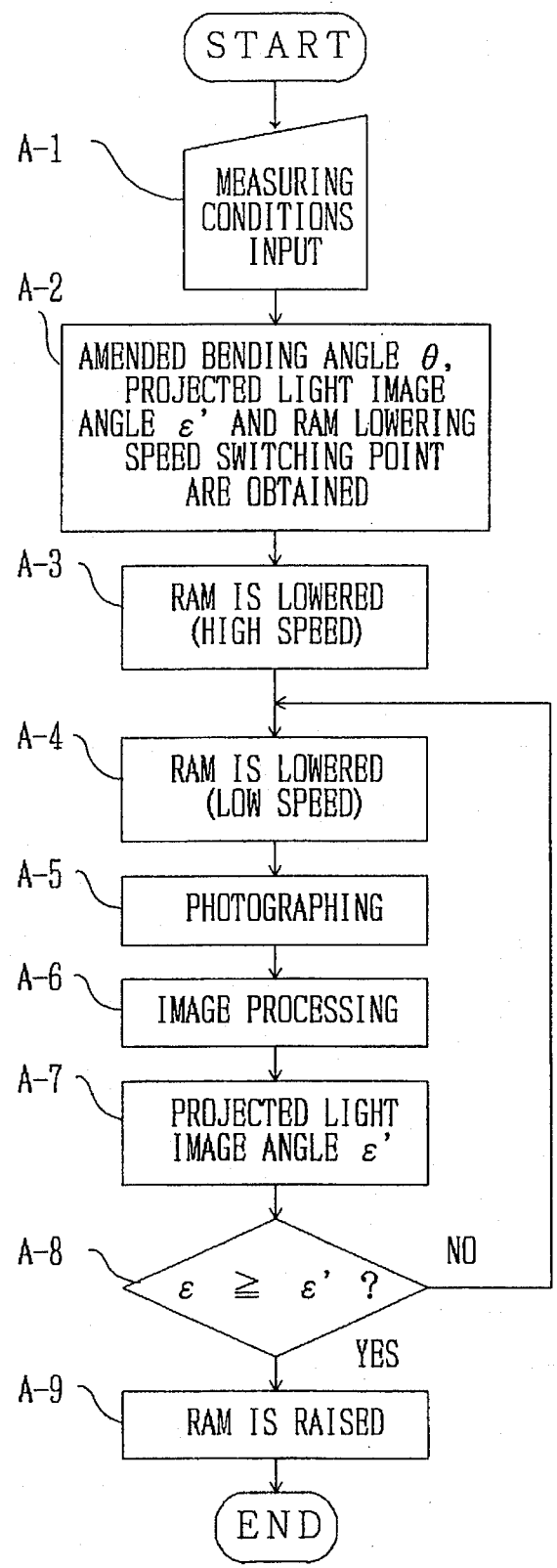

Reference is now made to the flow chart of FIG. 7 for explaining the process of bending the metal sheet W by the use of the metal sheet bending machine 1 of the invention.

Step A-1: Measuring conditions such as the thickness and material of the metal sheet W and the desired bending angle θ are input by the external input unit 15.

Step A-2: (i) An amended bending angle θ' taking into account the amount of spring back of the metal sheet W, (ii) the projected light image angle ε' of the linear image of projected measuring light R' when the metal sheet W is bent to the amended bending angle θ' and (iii) a switching point for the lowering speed of the ram 4 are obtained from the measuring conditions input in Step A-1. The amount of spring back is determined by the data on the relationship between the thickness of the metal sheet and the material of it, and the amount of spring back, the data being stored in the memory 14. In order to carry out rapid bending, the switching point for the ram lowering speed is set. Specifically, the ram 4 is firstly lowered short of the bottom dead point at high speed, and then the lowering speed is switched, at the above switching point, to a low speed at which the ram 4 is gradually lowered to the bottom dead point while the bending angle is being detected.

Step A-3: After the ram 4 has been lowered to the switching point at high speed, the ram lowering speed is switched to a low speed.

Step A-4: The ram 4 is lowered a short stroke at low speed.

Step A-5: The linear image of projected measuring light R which has been projected from the measuring light source 8 onto the outer face Wa is photographed by the CCD camera 9. Then, the photographed images including the linear image of projected measuring light R' are stored in the memory 14 as image data and at the same time, the images are displayed by the monitor television 13.

Step A-6: Image processing (to be described later) is performed on the linear image of projected measuring light R' taken out of the image data thus obtained, whereby a linear expression Q representing the linear image of projected measuring light R' is obtained.

Step A-7: Using the linear expression Q obtained in Step A-6, the projected light image angle ε of the linear image of projected measuring light R' is calculated.

Step A-8: If ε≧ε', it is judged that the metal sheet W has been bent to the amended bending angle θ' and the program proceeds to Step A-9. If ε<ε', the program goes back to Step A-4 in order to further bend the metal sheet W.

Step A-9: The ram 4 is raised. Since spring back takes place, the metal sheet W is bent to the desired bending angle θ, and thus, the bending process is completed.

Figure 8:
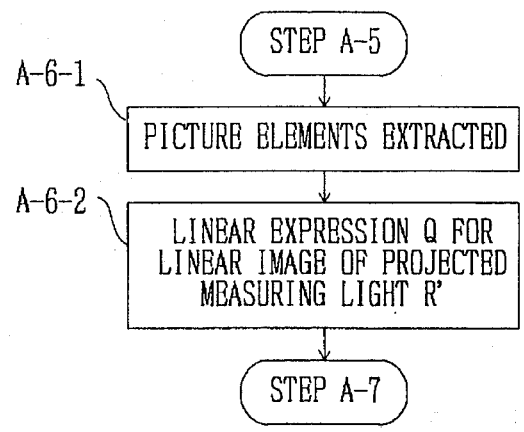

The image processing in Step A-6 will be hereinafter described with reference to the flow chart of FIG. 8.

Step A-6-1: Coordinates corresponding to an image having 480×512 picture elements are used, and picture elements (=points on the coordinates), which form the linear image of projected measuring light R', receiving light, are extracted by specified threshold value.

Step A-6-2: From the group of coordinate values for the light-receiving picture elements thus extracted, the linear expression Q representing the center line of the linear image of projected measuring light R' in the longitudinal direction is obtained using least squares.

As described above, according to the metal sheet bending machine 1 of the invention, the metal sheet W can be rapidly bent to a desired angle with high accuracy irrespective of the surface condition of the metal sheet W, so long as the bent legs have at least the same length as that of the long side of the slit (in this embodiment, the length of the long side is 10 mm).

Second Embodiment

In this embodiment, a metal sheet bending machine will be explained, in which a metal sheet is bent to a desired angle, using a reference light source in addition to the measuring light source described in the first embodiment. In the following explanation of the metal sheet bending machine of the second embodiment, only the parts that differ from those of the first embodiment will be described, and the same parts will be omitted. In the drawings illustrating the second embodiment, the same members as those in FIGS. 1 through 8 are indicated by the same reference numerals as used for the latter and an explanation on such members will be omitted.

Figure 9:
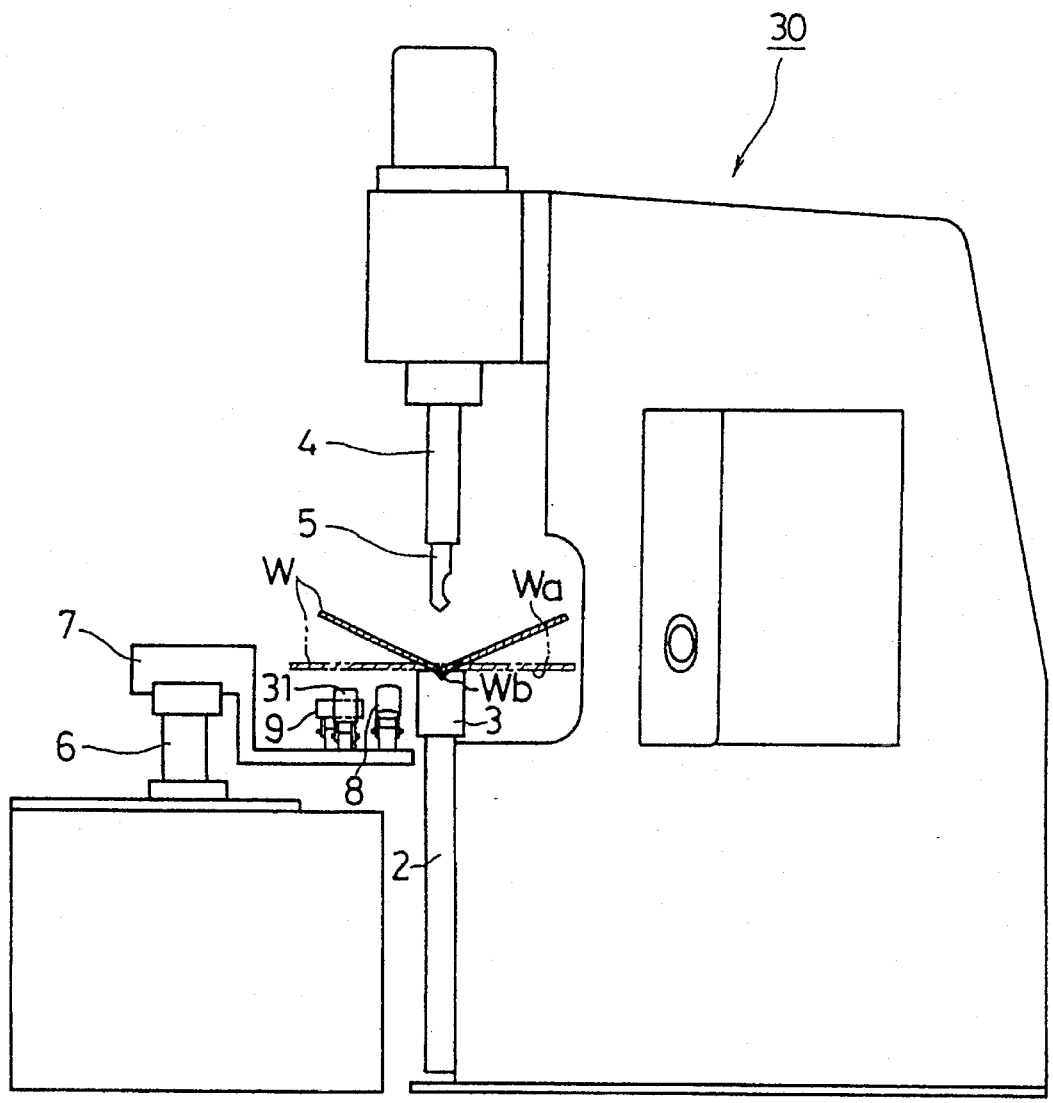
FIGS. 9 through 12 are for a second embodiment of a metal sheet bending machine according to the invention.
Figure 10:
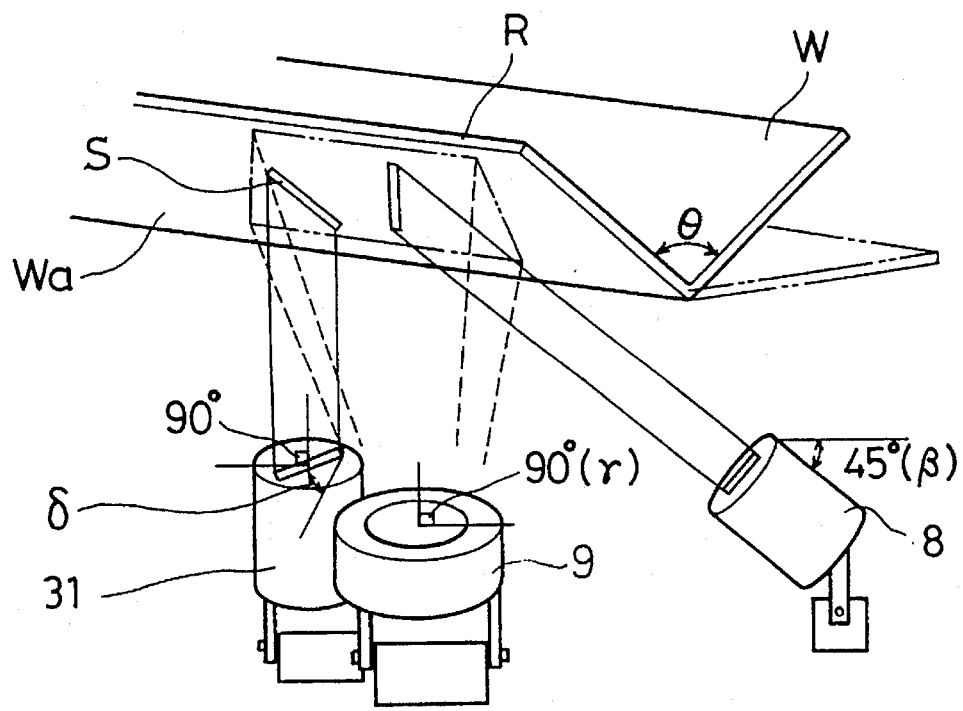

In FIG. 9, a metal sheet bending machine 30 includes the slit-shaped measuring light source 8, a reference light source 31 and the CCD camera 9 on the bracket 7. The measuring light source 8 is for projecting the linear image of projected measuring light R onto the outer face Wa of the metal sheet W, whilst the reference light source 31 is for projecting a linear image of projected reference image S onto the same. The CCD camera 9 is for photographing the linear image of projected measuring light R and linear image of projected reference light S formed by the measuring light sources 8 and reference light source 31, respectively. The angles formed by the outer face Wa of the bent metal sheet W and the respective light sources 8, 31 and the CCD camera 9 are adjustable, and these light sources 8, 31 and CCD camera 9 are movable in parallel with the bending line Wb of the metal sheet W. The slit-shaped reference light source 31 comprises, like the measuring light source 8 shown in FIG. 2, the semiconductor laser 10 for emitting parallel light having a wavelength of 0.8 μm and the slit plate 11 having a 2 mm(short side)×10 mm(long side) slit disposed on the optical path of the semiconductor laser 10.

It is understood from Equation (1) describing the relationship between the projected light image angle a of the linear image of projected light U' on the photographed images, the bending angle θ of the metal sheet W, the projection angle γ and the photographing angle γ that when the optical path of the light source L is parallel with the photographing axis of the CCD camera C in FIG. 4 that has been described in conjunction with the first embodiment, the projected light image angle α on the photographed images is constant irrespective of the bending angle θ of the metal sheet W.

Figure 11:
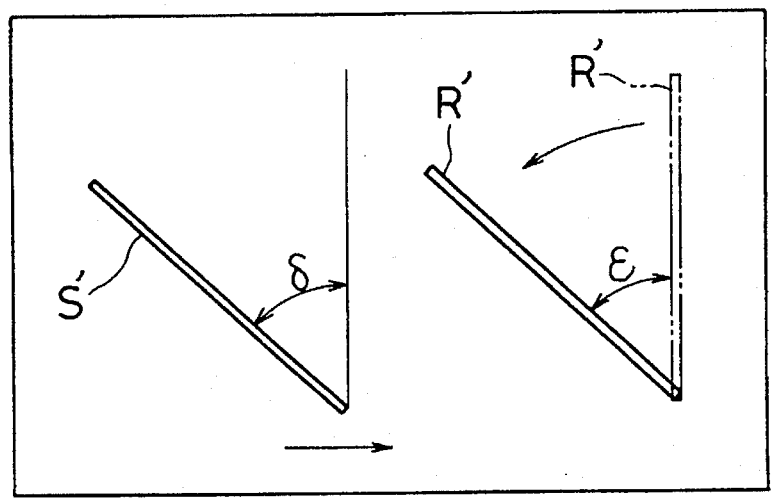

In the second embodiment, in consideration of the above-described relationship between the bending angle θ of the metal sheet W and the projected light image angle α on the photographed images, the measuring light source 8 is arranged at a position that is obtained from Equation (1) when the projection angle β is 45°, the CCD camera 9 is so arranged that the photographing angle γ is 90°, and the reference light source 31 is arranged such that its optical axis is parallel with the photographing axis of the CCD camera 9. FIG. 11 shows the photographed image when the linear image of projected measuring light R and the linear image of projected reference light S are formed on the outer face Wa of the bent metal sheet W by the measuring light source 8 and the reference light source 31, respectively, and are photographed in the above-described positional situation. The linear image of projected reference light S' formed by the reference light source 31 that rotates about the optical axis through an angle of δ is represented by a fixed projected light image angle δ (=the turning angle δ of the reference light source 31) irrespective of the bending angle θ of the metal sheet W. On the other hand, the linear image of projected measuring light R' formed by the measuring light source 8 is represented by the projected light image angle ε that varies in accordance with the bending angle θ of the metal sheet W.

Preferably, the turning angle δ of the reference light source 31 is arranged such that, on the photographed image, the projected light image angle ε of the linear image of projected measuring light R' formed by the measuring light source 8 is coincident with the projected light image angle δ of the linear image of projected reference light S' formed by the reference light source 31 when the metal sheet W is bent to the desired angle. As a result, there is a point where the linear image of projected measuring light R' becomes parallel with the linear image of projected reference light S' after performing the image processing with the ram 4 being lowered. At this point, the angle formed by the linear image of projected (measuring) light R' and linear image of projected reference light S' is 0° (that is, the projected light image angle ε=the projected light image angle δ). The above point is the bottom dead point for the ram 4, and by controlling the ram 4 with the ram control unit 16 such that the lowering of the ram 4 is stopped at the bottom dead point, the metal sheet W can be bent to the desired angle.

Figure 12:
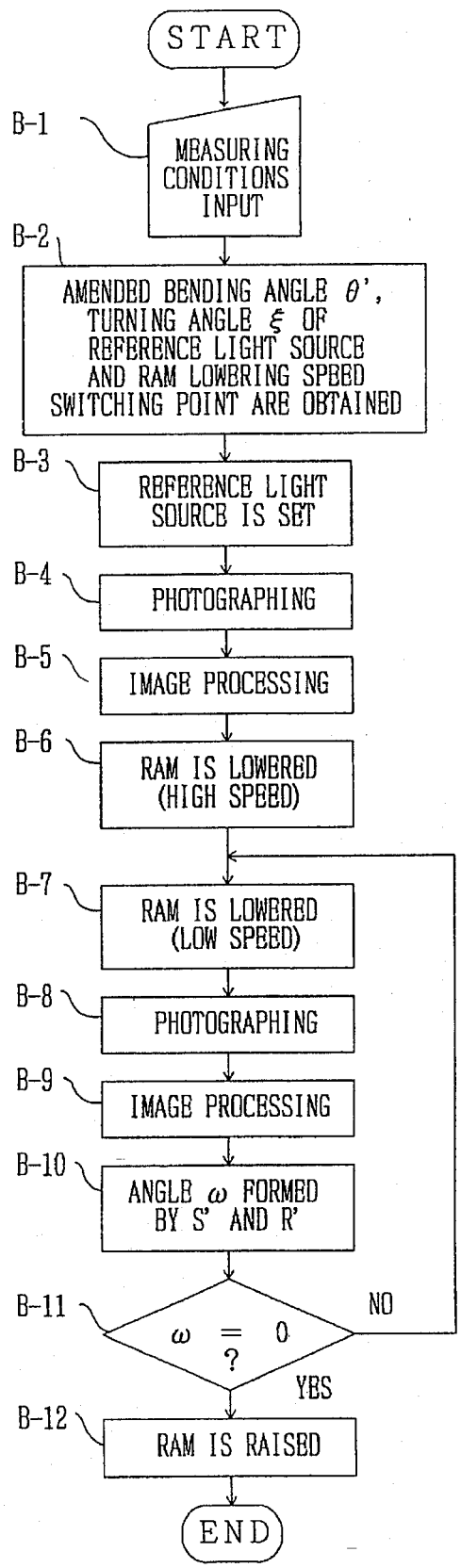

Reference is now made to the flow chart of FIG. 12 for explaining the process of bending the metal sheet W by the use of the metal sheet bending machine 30 of the invention.

Step B-1: Measuring conditions such as the thickness and material of the metal sheet W and the desired bending angle θ are input by the external input unit 15.

Step B-2: (i) The amended bending angle θ' taking into account the amount of spring back of the metal sheet W, (ii) the turning angle δ (=90°−θ'/2) of the reference light source 31 and (iii) a switching point for the lowering speed of the ram 4 are obtained from the measuring conditions input in Step B-1.

Step B-3: The reference light source 31 is turned through the angle δ so that the projected light image angle of the linear image of projected reference light S' formed by the reference light source 31 on the photographed images is set to δ.

Step B-4: The linear image of projected reference light S which has been projected onto the outer face Wa is photographed by the CCD camera 9. Then, the linear image of projected reference light S' on the photographed images is stored in the memory 14 as image data and at the same time, displayed by the monitor television 13.

Step B-5: From the obtained image data, a linear expression P representing the linear image of projected reference light S' is obtained in the same method as used in the first embodiment for obtaining the linear expression Q representing the linear image of projected measuring light R' (see FIG. 8). This linear expression P is stored in the memory 14.

Step B-6: After the ram 4 has been lowered to the switching point at high speed, the ram lowering speed is switched to a low speed.

Step B-7: The ram 4 is lowered a short stroke at low speed.

Step B-8: The linear image of projected reference light S and the linear image of projected measuring light R which have been projected onto the outer face Wa are photographed by the CCD camera 9. Then, the photographed images including the linear image of projected measuring light S' and the linear image of projected reference light R' are stored in the memory 14 as image data and at the same time, displayed by the monitor television 13.

Step B-9: The same image processing as that of the first embodiment (see FIG. 8) is performed on the linear image of projected measuring light R' taken out of the obtained image data, thereby obtaining the linear expression Q representing the linear image of projected measuring light R'.

Step B-10: From the linear expression P obtained in Step B-5 and the linear expression Q obtained in Step B-9, the angle ω formed by the linear image of projected reference light S' and the linear image of projected measuring light R' is calculated.

Step B-11: If ω=0, it is judged that the linear image of projected measuring light R' is parallel with the linear image of projected reference light S' and the metal sheet W has been bent to the amended bending angle θ'. Then the program proceeds to Step B-12. If ω≠0, the program goes back to Step B-7 in order to further bend the metal sheet W.

Step B-12: The ram 4 is raised. Since spring back takes place, the metal sheet W is bent to the desired bending angle θ, and thus, the bending process is completed.

Similarly to the first embodiment, according to the metal sheet bending machine 30 of the invention, the metal sheet W can be rapidly bent to a desired angle with high accuracy irrespective of the surface condition of the metal sheet W, so long as the bent legs have at least the same length as that of the long side of the slit (in this embodiment, the length of the long side is 10 mm).

In the course of the above, bending process, after completion of Step B-11, the reference light source 31 or the measuring light source 8 is moved in parallel with the bending line Wb of the metal sheet W such that the linear image of projected reference light S' is coincident with the linear image of projected measuring light R' on the monitor television 13, whereby it can be visually confirmed that the metal sheet W has been bent to the amended bending angle θ'.

In the second embodiment, the angle ω between the linear image of projected measuring image R' formed by the measuring light source 8 and the linear image of projected reference light S' formed by the reference light source 31 is obtained in order to detect the amended bending angle θ'. In stead of the above arrangement, the amended bending angle θ' may be detected by making a comparison between the projected light image angle δ of the linear image of projected reference light R' and the projected light image angle ε of the linear image of projected measuring light S'. In this case, the processing is performed by comparing the inclination of the linear expressions P representing the linear image of projected reference light R' with that of the linear expression Q representing the linear image of projected measuring light S'.

Although the measuring light source 8 is arranged such that the projection angle is 45° and the CCD camera 9 is arranged at a photographing angle of 90° for the purpose of simplifying Equation (1) in the first and second embodiments, the invention is not necessarily limited to the above situation and arbitrary angles can be selected, and the turning angle of the reference light source 31 can be determined by obtaining the relationship between the bending angle θ and the projected light image angle α from Equation (1). Further, it is possible to detect the bending angle at an arbitrary position of the outer face Wa by moving the measuring light source 8, the reference light source 31 and the CCD camera 9 in parallel with the bending line Wb of the metal sheet W. Accordingly, in the case where the optical path is interrupted by the frame 2 or the lower bender 3, because of their shapes, the outer face Wa of the bent metal sheet W may be photographed after the measuring light source 8, the reference light source 31 and the CCD camera 9 have been moved or alternatively, the projection angle and the photographing angle have been adjusted.

Although the invention has been particularly described with linear projected light images obtained by semiconductor lasers and slit plates in the first and second embodiments, a plurality of spot-shaped light sources arranged in a line could be employed instead, and the projected light image angle could be obtained by calculating an approximate direct line that passes through the center of each projected spot. Further, in the metal sheet bending machines in these embodiments, a metal sheet is bent by lowering the upper bender, but it is possible to bend a metal sheet by raising the lower bender or activating both the upper and lower benders.

Figure 13:
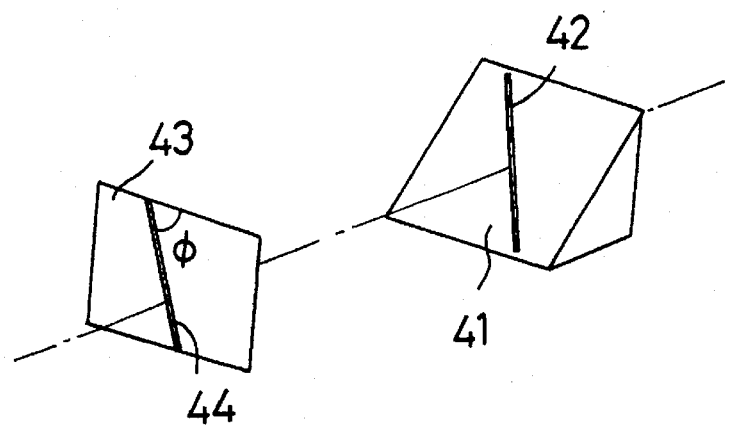
FIGS. 13 to 15 are for explaining an error in the detection of a bending angle, the error being due to the focal point of a lens provided in the metal sheet bending machine according to the invention.
Figure 14:
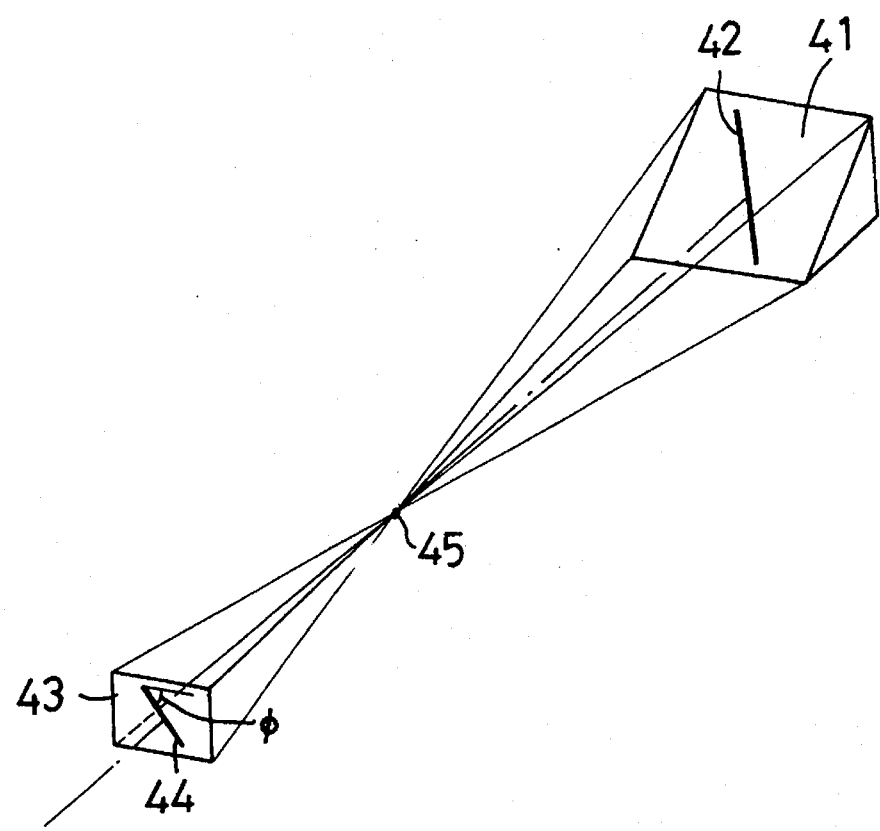

In each of the foregoing embodiments, the bending angle θ of the metal sheet W is calculated on condition that a linear image of projected measuring light 42 on a surface to be measured 41 is projected on a photographing plane 43 of the CCD camera by orthogonal projection, as shown in FIG. 13. When the linear image of projected measuring light 42 is projected on the photographing plane 43 by orthogonal projection, even if the distance between the surface to be measured 41 and the photographing plane 43 varies, the angle ø of a linear projected light image 44 formed on the photographing plane 43 does not vary. However, in practice, since an image (i.e., the linear projected light image 44) of the linear image of projected measuring light 42 on the surface to be measured 41 is formed on the photographing plane 43 through a focal point 45 of a lens as shown in FIG. 14, the angle ø of the linear-projected light image 44 varies depending on the distance between the surface to be measured 41 and the photographing plane 43, except for a special case in which the linear image of projected measuring light 42 on the surface to be measured 41 intersects the photographing axis of the CCD camera. This will be explained with reference to FIG. 15.

Figure 15:
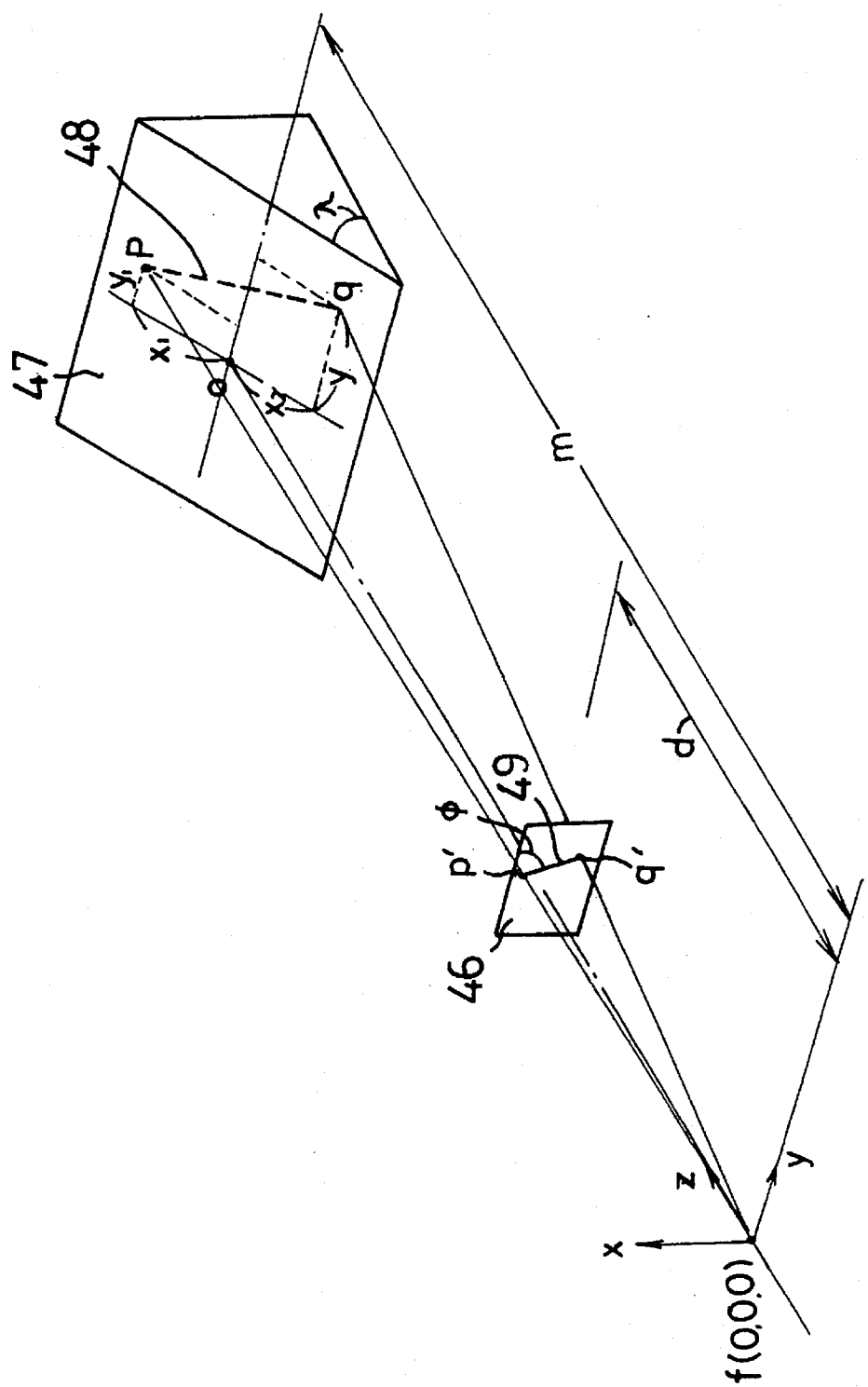

In FIG. 15, a coordinate system x, y, z in which the focal point f of the CCD camera is set as the origin is drawn. A photographing plane 46 is a plane which is parallel to the x-y plane, being a distance d away from the focal point f. A surface to be measured 47 is a plane rotated about a straight line parallel to the y-axis to make an angle λ with the y-z plane. The intersection of the surface to be measured 47 and the z-axis is represented by a point o, and this point o is a distance m away from the focal point f. When the ends of a linear image of projected measuring light 48 on the surface to be measured 47 are represented by points p and q respectively and the positional relationship between these points p, q and the point o is as shown in FIG. 15, the coordinates p(x, y, z) of the point p and the coordinates q(x, y, z) of the point q are given by the following equations (5) and (6).

$$p(x, y, z) = (x_1 \times \sin \lambda, y_1, m + x_1 \times \cos \lambda) \quad (5)$$

$$q(x, y, z) = (-x_2 \times \sin \lambda, y_2, m - x_2 \times \cos \lambda) \quad (6)$$

Then, the straight lines connecting the points p, q and the focal point f are drawn and the points at which these two straight lines intersect the plane z=f (photographing plane) are represented by p' and q'. The coordinates p'(x, y, z) of the point p' and the coordinates q'(x, y, z) of the point q' are given by the following equations (7) and (8).

$$p'(x, y, z) = (f \times x_1 \times \sin \lambda/(m + x_1 \times \cos \lambda), f \times y_1/(m + x_1 \times \cos \lambda), f) \quad (7)$$

$$q'(x, y, z) = (-f \times x_2 \times \sin \lambda/(m - x_2 \times \cos \lambda), f \times y_2/(m - x_2 \times \cos \lambda), f) \quad (8)$$

A linear projected light image 49 obtained by photographing the linear image of projected measuring light 48 formed on the surface to be measured 47 is equal to the line segment p' q' on the plane z=f, the line segment of which is determined by the equations (7) and (8), so that the inclination angle ø of the linear projected light image 49 is described by the equation (9).

$$\tan \phi = \frac{-f \times x_2 \times \sin \lambda/(m - x_2 \times \cos \lambda)}{f \times y_2/(m - x_2 \times \cos \lambda)} \frac{-f \times x_1 \times \sin \lambda/(m + x_1 \times \cos \lambda)}{-f \times y_1/(m + x_1 \times \cos \lambda)} \quad (9)$$

It is apparent from the equation (9) that the inclination angle ø of the linear projected light image 49 is dependent on the distance m between the focal point f and the surface to be measured 47. Therefore, when the detection error is required to be smaller than an error in the bending angle caused by the calculation performed on condition that the linear image of projected measuring light 48 is projected onto the photographing plane 46 by orthogonal projection as described above, it is necessary to calculate the bending angle taking the distance m into account.

With reference to FIGS. 16 to 19, an example of the calculation will be described, in which the distance m between the focal point f and the surface to be measured is taken into account in order to increase accuracy in calculating the bending angle θ of the metal sheet W.

Figure 16:
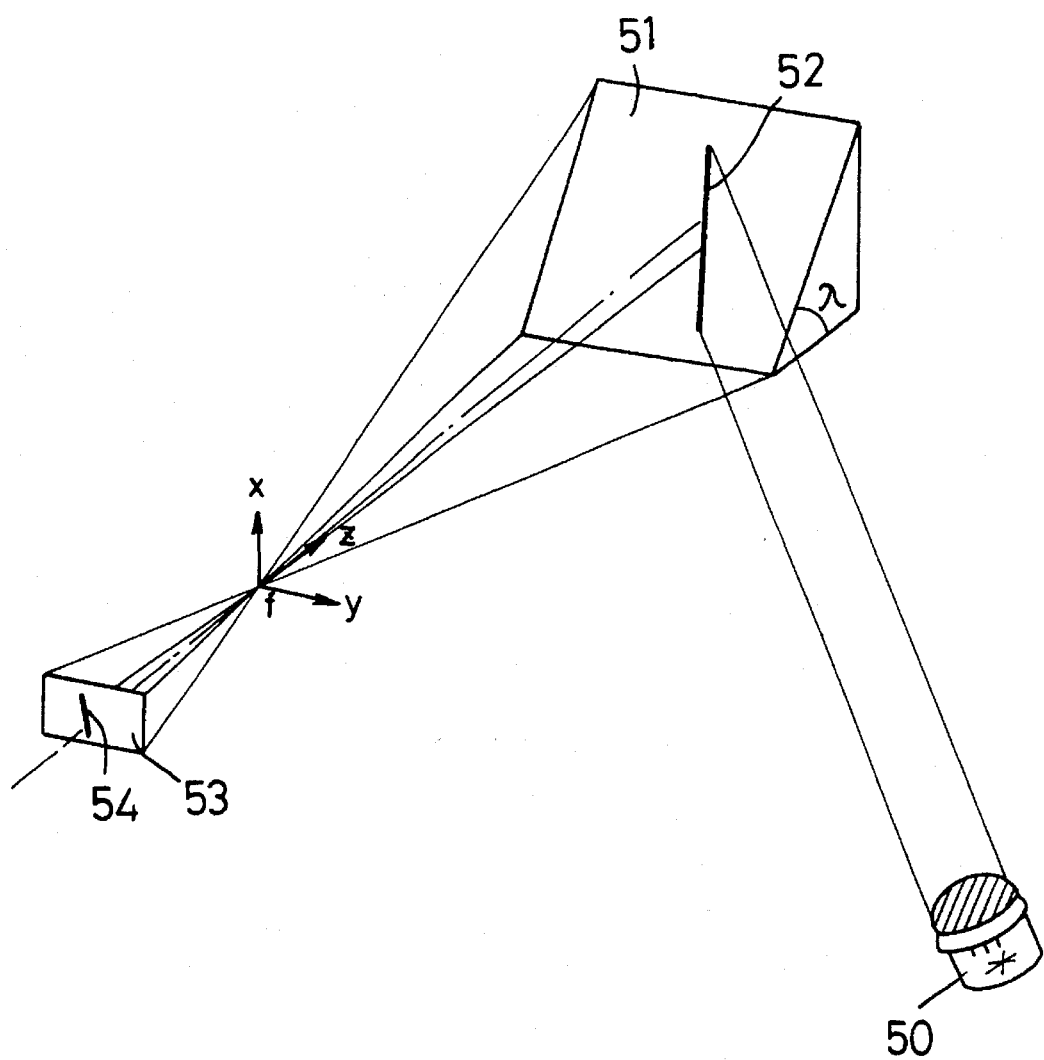

In this example, an optical system including a measuring light source 50 and a CCD camera is arranged such that a linear image of projected measuring light 52 is projected onto a surface to be measured 51 from the measuring light source 50 as shown in FIG. 16 and a linear projected light image 54 corresponding to the linear image of projected measuring light 52 is formed on a photographing plane 53 of the CCD camera. Preferably, the measuring light source 50 and the CCD camera are fixed units. For simplicity, this example is described under such conditions that the focal point f of the CCD camera is set as the origin of the coordinate system; the surface to be measured 51 is a plane rotated about a straight line parallel to the y axis; and an angle to be detected is the angle λ formed by the surface to be measured 51 and the y-z plane.

When calculating the inclination angle λ of the surface to be measured 51, the position of the focal point f of the CCD camera serving as the photographing means is firstly obtained by an optical test and a space coordinate system x, y, z in which the focal point f thus obtained is set as the origin is determined.

Then, a calibration plate 55 parallel with the x-y plane is disposed at the position of Z=m and the plate 55 is photographed by the CCD camera. On this calibration plate 55, a grid pattern having a given pitch a (e.g., 2 mm) is depicted as shown in FIG. 17 and the coordinates of the intersections of the grid lines are given. In the case where the grid pattern has a pitch of 2 mm for example, the coordinates A (x, y, z) of point A in a photographed image shown in FIG. 18 are specified as (2, 2, m). In this way, any pixel position in the photographing plane of the CCD camera can be represented by coordinates in the plane (calibration plane) z=m, by photographing the calibration plate 55 with the CCD camera, In this case, the coordinates in the plane Z=m which correspond to a desired pixel position in the photographing plane of the CCD camera can be calculated by interpolating the relationship between several pixel positions and their coordinates obtained by calibration. Accordingly, the pixel positions of at least two points in the photographing plane 53, through which the linear projected light image 54 passes, can be represented by coordinates in the calibration plane z=m corresponding to these points, and the equation of a plane in which these points and the origin (focal point) f(0, 0, 0) lie can be unitarily determined.

In order to measure the projecting direction of the measuring light source 50 for projecting linear measuring light, two slits 56, 57, each of which has an opening parallel to the x axis, are disposed at the positions where (y, z) =($y_1$, $z_1$), ($y_2$, $z_2$) respectively as shown in FIG. 19 and the positions of the slits 56, 57 are adjusted such that the measuring light can pass through both of the slits 56, 57. The plane of the measuring light can be unitarily determined by the following equation (10).

$$(y-y_1)/(z-z_1)=(y_2-y_1)/(z_2-z_1) \quad (10)$$

The linear image of projected measuring light 52 on the surface to be measured 51 is the intersection of the plane in which the aforesaid points on the linear projected light image 54 and the origin f (0, 0, 0) lie and the plane of the measuring light given by the equation (10), so that the line representative of the linear image of projected measuring light 52 can be obtained by the simultaneous equation (11) in which the respective equations of the above mentioned two planes are joined.

$$\begin{pmatrix} x \\ y \\ z \end{pmatrix} = \begin{pmatrix} u \\ v \\ w \end{pmatrix} + t \begin{pmatrix} a \\ b \\ c \end{pmatrix} \quad (11)$$

(t = arbitrary real number)

Therefore, the angle λ between the surface to be measured 51 and the y-z plane can be described by the equation (12).

$$\tan \lambda = a/c \quad (12)$$

Although the calibration plate has a grid pattern of a given pitch in the foregoing example, it is apparent that the calibration plate could have a dot pattern, concentric circle pattern or other patterns as far as the pitch is given. In this case, image distortion etc. caused by lens aberration can be corrected by increasing the number of calibrations to be performed in order to perform more accurate measurement.

Industrial Applicability

According to the metal sheet bending machine of the invention, a metal sheet can be rapidly bent to a desired angle with high accuracy irrespective of the surface condition of the metal sheet, even if the bent legs are short. This enables a wide range of applications of the invention, in which metal sheets of various materials and various sizes are employed.

We claim:

1. A metal sheet bending machine for being a metal sheet, said machine having an upper bender and lower bender between which the metal sheet is positioned for bending the metal sheet to a desired angle along a bending line, said machine comprising:

(a) a measuring light source for projecting a linear image onto an outer face of the metal sheet while the metal sheet is being bent to the desired angle, said light source positioned relative to the metal sheet so that the linear image of projected measuring light rotates as the bending angle of the metal sheet changes as a result of bending of the metal sheet by changing the relative position of the upper and lower benders;

(b) photographing means for sequentially photographing the outer face of the bent metal sheet on which the linear image of projected measuring light is formed by the measuring light source, while the metal sheet is being bent to the desired angle, said photographing means forming sequential images representative of the position of the linear image on the outer face as the metal sheet is bent;

(c) memory means for storing the sequential images which have been photographed by the photographing means, each sequential image including the linear image of projected measuring light;

(d) calculating means for calculating, based on changes in the rotated angular position of the linear image of successive sequential image stored in the memory means and based on a preset photographing angle for the photographing means and a preset light projecting angle for the measuring light source, a bending angle of the metal sheet while the metal sheet is being bent and the resulting sequential images are being photographed; and (e) control means for controlling the positions of the upper bender and/or lower bender according to a calculation result obtained from the calculating means.

2. The metal sheet bending machine as claimed in claim 1, further comprising a reference light source forming a linear image of projected reference light on the outer face of the metal sheet while the metal sheet is being bent to the desired angle so as to form the linear image at a desired fixed angle irrespective of the bending angle, on the images photographed by the photographing means, wherein the desired bending angle of the metal sheet calculated by the calculating means is a function of an angle formed by the linear image of projected measuring light and the linear image formed by the reference light source.

3. The metal sheet bending machine as claimed in claim 2, wherein the reference light source forms the linear image of projected reference light such that said desired bending angle of the metal sheet calculated by the calculating means is obtained when the linear image of projected measuring light is parallel with the linear image of projected reference light.

4. The metal sheet bending machine as claimed in any one of the claims 1, 2 or 3, wherein said measuring light source and said photographing means are each movable along an axis in parallel with a bending line of the metal sheet.

5. The metal sheet bending machine as claimed in claims 2 or 3, wherein said reference light source is movable along an axis in parallel with the bending line of the metal sheet.

6. The metal sheet bending machine as claimed in claims 2 or 3, wherein said measuring light source, said photographing means and said reference light source are each movable along an axis in parallel with the bending line of the metal sheet.

7. The metal sheet bending machine as claimed in any one of the claims 1, 2 or 3, wherein said linear images photographed by the photographing means are displayed on an image display means.

8. The metal sheet bending machine as claimed in any one of the claims 1, 2 or 3, wherein said measuring light source comprises a source selected from a slit-shaped measuring light source and a plurality of spot-shaped measuring light sources arranged in a line.

9. The metal sheet bending machine as claimed in claims 2 or 3, wherein said reference light source comprises a source selected from a slit-shaped reference light source and a plurality of spot-shaped reference light sources arranged in a line.

10. The metal sheet bending machine as claimed in claim 1, wherein the photographing angle is set to 90° and the light projecting angle is set to 45°.

11. A metal sheet bending machine for bendinq a metal sheet, said machine having an upper bender and lower bender between which the metal sheet is positioned for bending the metal sheet to a desired angle along a bending line, said machine comprising:

(a) a measuring light source for projecting a linear image onto an outer face of the metal sheet while the metal sheet is being bent to the desired angle, said light source positioned relative to the metal sheet so that the linear image of projected measuring light rotates as the bending angle of the metal sheet changes as a result of bending of the metal sheet by changing the relative position of the upper and lower benders;

(b) photographing means for sequentially photographing the outer face of the bent metal sheet on which the linear image of projected measuring light is formed by the measuring light source, while the metal sheet is being bent to the desired angle, said photographing means forming sequential images representative of the position of the linear image on the outer face as the metal sheet is bent;

(c) memory means for storing the sequential images which have been photographed by the photographing means, each sequential image including the linear image of projected measuring light;

(d) calculating means for calculating, based on changes in the rotated angular position of the linear image of successive sequential image stored in the memory means based on a first equation representative of a plane defined by the image of the linear image of projected measuring light, formed by the photographing means, and by a focal point of the photographing means, and based on a second equation representative of a plane of measuring light projected from the measuring light source, a bending angle of the metal sheet while the metal sheet is being bent and the resulting sequential images are being photographed; and (e) control means for controlling the positions of the upper bender and/or lower bender according to a calculation result obtained from the calculating means.

12. The metal sheet bending machine as claimed in claim 11, wherein the first equation is calculated based on the coordinates of an image formed by the photographing means, the image being formed on a calibration plate disposed between the outer face of the metal sheet and the photographing means.

13. The metal sheet bending machine as claimed in claim 12, wherein the calibration plate is a plate on which there is depicted a grid, dot or concentric circle pattern having a given pitch.

14. The metal sheet bending machine as claimed in claim 11, wherein the second equation is calculated based on the positions of two slits through which the measuring light passes, the slits being disposed between the measuring light source and the outer face of the metal sheet.

* * * * *